Patented Aug. 28, 1951

2,565,464

UNITED STATES PATENT OFFICE 2,565,464

CARBONYLATION OF ARYL HALIDES

Georges E. Tabet, Wilmington, Del., assignor to E. I. du Pont de Nemours and Company, Wilmington, Del., a corporation of Delaware No Drawing. Application December 22, 1950, Serial No. 202,411

9 Claims. (Cl. 260—475)

This invention relates to an improved process for carbonylation of organic halides, including aryl halides, such as monochlorobenzene, dichlorobenzenes and related compounds. The specific improvement to which the present invention is directed relates to the use of certain modifiers, which have a beneficial effect upon the carbonylation reaction.

The term "carbonylation," as employed herein, means the introduction of C=O into an organic molecule.

In copending application S. N. 96,138, filed May 28, 1949, it is disclosed that the carbonylation of aryl halides, e. g. dichlorobenzene, in the presence of acetic acid as "modifier," and in the presence of a carbonyl of a metal of the iron group, yields the corresponding carboxylic acids. The reaction may be represented as follows:

When the dichlorobenzene which is employed is para-dichlorobenzene the carbonylation product is terephthalic acid, or an anhydride thereof, or intermediates which, if desired, can be converted readily to terephthalic acid. The said copending application also discloses that esters (e. g. esters of alkanoic acids, methyl formate) may be employed, instead of the alkanoic acids themselves. The present application is a continuation-in-part of the said copending application S. N. 96,138.

Carbonylation of organic halides in the presence of certain specific catalysts (generally of the Friedel-Crafts type) were known heretofore (Thomas, Anhydrous Aluminum Chloride in Organic Chemistry, Reinhold Publishing Corp., New York, N. Y., 1941, page 767; Arch. Pharm. 265, 187–95 (1927); Anales soc. espan. fis. Quim. 27, 663–7 (1929); German Patent 537,610; U. S. Patents 2,003,477, 2,053,233, 2,062,344, 2,378,048, 2,411,982; British Patents 547,101 and 581,278; copending application S. N. 14,384, filed September 1, 1948).

An object of the present invention is to provide an improved catalytic process for carbonylation of organic halides, including aryl halides. Other objects of the invention will appear hereinafter.

The present invention is directed to the novel method for carbonylation of organic halides, by the use of nickel carbonyl or a similar metal carbonyl as an agent which assists or effects the carbonylation reaction in the presence of an ester of an organic carboxylic acid, more specifically an ester of the class consisting of alkyl formates, carbonates, oxalates and ortho-carboxylates.

Whether the metal carbonyl is considered as acting catalytically, or as an active carbon monoxide carrier, or as a reactant, or a substance which generates a transitory active agent, is not necessarily known, and such theoretical considerations are not intended to limit the invention in any way.

The invention, in particular embodiments, is directed to the carbonylation of aryl halides having chlorine, bromine or iodine attached directly to an aromatic nucleus, e. g. a benzene nucleus or a naphthalene nucleus. Suitable reactants include monochlorobenzene, dichlorobenzenes, trichlorobenzenes, polychloronaphthalene, etc., and their bromine and iodine analogs. The organic carboxylic ester reactants include the alkyl and aryl esters of formic and oxalic acid, and carbonic acid. Ortho esters, especially alkyl orthoformates and orthoalkanoates, give excellent results.

The quantity of the ester reactant may be varied very widely. Best results are achieved when the quantity of ester is at least one mol per equivalent of C-halogen group in the aryl halide. The lower esters, namely those having from 2 to 7 carbon atoms per molecule are generally preferred, since they are readily handled, and do not interfere seriously with the separation of the reaction products. Frequently it is desirable to employ a mixture of organic acid and ester, or a mixture of an alcohol and an ester. The use of alcohols is disclosed in copending application S. N. 96,137, filed May 28, 1949. Inert diluents such as benzene, cyclohexane, etc., may be employed in addition to the reactive diluent herein disclosed.

The metal carbonyls which may be employed in the practice of the invention are carbonyls of metals which are members of the iron sub-group, namely iron, nickel and cobalt. They may be introduced as such or produced in situ.

It is usually desirable to employ at least about one mol of metal carbonyl per equivalent of the C-halogen group reacting. In a continuous process this can be accomplished by continuously replenishing the metal carbonyl to make up for any losses caused by reaction or by thermal decomposition; thus, if the process is operated continuously, the quantity of nickel carbonyl which is introduced or which may be generated per unit of reaction time should be preferably at least one mol per mol of C-halogen group reacting. In batchwise operation it is preferable to employ initially at least one equivalent (0.25 mol) of nickel carbonyl per equivalent of C-halogen group reacting. This, of course, is not intended to imply that an excess of the organic halide cannot be present, but rather that the number of equivalents of C-halogen group undergoing reaction may be limited by the number of available equivalents of nickel carbonyl. Relatively small quantities of nickel salts, such as nickel chloride, therefore are not highly effective. Reaction mixtures containing from 0.25 to 2.5 mols of metal carbonyl per equivalent of C-halogen give the best results.

The carbonylation of organic halides in accordance with this invention takes place relatively slowly at temperatures below about 200° C. It is therefore generally preferred to carry out the reaction at a temperature within the range of about 250° to 450° C. Best results are obtained when superatmospheric pressures are employed, preferably pressures within the range of about 50 to 1500 atmospheres.

Any convenient or suitable apparatus may be used in the carbonylation of organic halides according to the process of this invention. In batchwise operation pressure-resistant autoclaves made of or lined with relatively inert metals, such as stainless steel, silver, copper, etc., may be employed advantageously. In continuous operation tubular reaction vessels may be employed and, if desired, the reactants may be introduced at more than one point along the tubular reaction vessel. Similarly, the metal carbonyl, or a substance which produces metal carbonyl under the reaction conditions, may be injected at one or more points along a tubular reaction vessel, if desired.

Any suitable method may be employed for separating the carbonylation products from the reaction mixture obtained in the practice of the invention. The carboxylic acids, which in particular embodiments are formed by the action of water on the carbonylation products, in general can be separated from the reaction mixture by steam distilling any volatile products which may be present and recovering relatively insoluble acid from the residue.

For reasons of economy, it is frequently desirable to recover all of the metal, e. g. nickel, and recycle the same as metal carbonyl, along with additional quantities of the halide reactant.

While carbon monoxide may be present in the reaction mixture, it should be understood that the introduction of carbon monoxide from an external source is not always necessary, since carbon monoxide which is combined with the nickel carbonyl is also effective in the carbonylation reaction. Moreover, the carbon monoxide can be generated in situ by the action of the catalyst on methyl formate. The methyl formate, under these circumstances, acts like a mixture of methanol and carbon monoxide.

The invention is illustrated further by means of the following examples.

Example 1.—Into a stainless steel shaker tube, 26 grams p-chlorotoluene (0.2 mol), 36 grams Ni(CO)$_4$ and 100 cc. methyl formate were charged, and the mixture was heated under autogenous pressure at 299° to 308° C. for 2 hours. The contents of the reaction vessel were withdrawn, and the vessel was washed with benzene. The product and benzene wash were combined and filtered to remove inorganics. Upon distillation of the organic filtrate the solvent was recovered and the following fractions obtained: 1.9 grams foreshot, b. p. 47° C./18 mm., 21.2 grams methyl p-toluate, b. p. 107° to 108° C./18 mm. (N. E. 149; theory 150). From the distillation residue 2.5 grams of p-toluic acid were recovered. This represents a 70% conversion to ester and a 9% conversion to acid.

Example 2.—When a charge similar to that of the previous example was processed under the same conditions substituting 23.6 grams ethyl carbonate (0.2 mol) and 100 cc. benzene solvent for methyl formate, the product upon rectification gave 25.6 grams ethyl p-toluate, b. p. 110° to 118° C./19 mm. which represents an 80% conversion to ester.

Example 3.—When 30 grams of bromobenzene, 36 grams of nickel carbonyl and 100 grams of methyl formate are heated with carbon monoxide under a pressure of 700 atmospheres at 300° C. for 2 hours, and the resulting product is distilled, methyl benzoate is obtained as the chief reaction product.

Example 4.—When 26 grams p-chlorotoluene, 36 grams nickel carbonyl, 29.2 grams ethyl oxalate (0.2 mol) and 100 cc. benzene solvent were heated at 300° to 307° C. for 2 hours in a stainless steel shaker tube, the product upon distillation gave 4.3 parts p-chlorotoluene (15% recovery), 10 grams ethyl p-toluate, b. p. 110° to 117° C./18 mm. (31% conversion). Toluic acid (18% conversion) was recovered from the distillation residue.

Example 5.—Into a continuous tubular reaction vessel carbon monoxide was introduced and heated under 500 atmospheres pressure, at a temperature of 350° C. A liquid feed composed of 5.0 parts p-dichlorobenzene, 0.6 parts Ni(CO)$_4$, 47.2 parts methyl acetate and 47.2 parts methyl formate was injected into the vessel at a rate of 400 cc./hr., and off-gas was released at the rate of 2.4 to 2.5 cu. ft./hr. The product on a weight basis contained 35.2% dimethyl terephthalate and 30% methyl p-chlorobenzoate, i. e., the yield of product in hand was 65% of the theoretical.

A similar run was made except for the fact that CO was not introduced. A 44.3% conversion to dimethyl terephthalate and 15.7% to methyl p-chlorobenzoate was obtained, showing that the methyl formate was the source of the CO.

When methyl acetate alone was used as the carbonylation medium with CO introduced from an external source, only a 6.4% conversion to dimethyl terephthalate and a 16.6% conversion to methyl p-chlorobenzoate was obtained, indicating that the formate ester was the main alkoxy donor in this instance.

Example 6.—A charge of 26 grams p-chlorotoluene (0.2 mol), 36 grams nickel carbonyl (0.2 mol), 30 grams ethyl ortho-formate (0.2 mol) and 100 cc. of dry benzene was placed in a stainless steel shaker tube. The mixture was heated at 300° for 2 hours, discharged, and the tube washed with 100 cc. of benzene. The combined product and wash was filtered to remove the nickel salts, and the organic filtrate was distilled. After recovery of residual nickel carbonyl and benzene solvents 2.9 grams of p-chlorotoluene (ca. 11% recovery) and 25.9 grams of ethyl p-toluate (80% conversion) was obtained. The ester had a saponification equivalent of 166 (theory 164), boiling point 121° C. at 18 mm. Hg, and a refractive index at 26°, 1.5055.

It is to be understood that the foregoing examples are illustrative only and that they are not intended to limit the scope of the invention in any way. Numerous variations of the illustrated procedure will be apparent to those who are skilled in the art. For example, various acceptors for the hydrogen halide which may be generated when the carbonylation is carried out in an aqueous system may be introduced if desired. Water is usually avoided as one of the ingredients of the reaction mixture. The unreacted organic halide may, of course, be recovered and recycled. This is true also of the intermediate reaction products, such as the monochlorobenzoic acids. It is my intention that such changes and modifications to the extent that they are within the scope of the appended claims shall be considered as part of my invention.

I claim:

1. The method for carbonylation of compounds having a halogen atom of the class consisting of chlorine and bromine attached to an aromatic nucleus which comprises carrying out the said carbonylation reaction in the presence of a carbonyl of a metal of the iron sub-group, and an ester of the class consisting of alkyl formates, carbonates, oxalates, and orthocarboxylates, said ester being introduced initially into the reaction vessel.

2. The process of claim 1 in which the said ester is an alkyl formate.

3. The process of claim 1 in which the said ester is a dialkyl carbonate.

4. The process of claim 1 in which the said ester is a dialkyl oxalate.

5. The process of claim 1 in which the said ester is an alkyl orthoester.

6. The method for carbonylation of aryl halohydrocarbons having a member of the class consisting of chlorine and bromine attached directly to a benzene nucleus which comprises carrying out the said carbonylation reaction in the presence of nickel carbonyl and methyl formate.

7. The method of claim 6 in which the said halohydrocarbon is a para-dihalobenzene.

8. The method of claim 6 in which the said halohydrocarbon is para-chlorotoluene.

9. In a process for carbonylation of a para-dihalobenzene in which the halogen atoms are members of the class consisting of chlorine and bromine, the steps which comprise heating said para-dihalobenzene with nickel carbonyl and an alkyl formate, said alkyl formate having from 2 to 7 carbon atoms per molecule, at a temperature of 250° to 450° C. under a pressure within the range of 50 to 1500 atmospheres, whereby a carbonylation product is formed, thereafter converting the said product to terephthalic acid by the action of water, and recovering terephthalic acid from the resulting mixture.

GEORGES E. TABET.

No references cited.